UNITED STATES PATENT OFFICE.

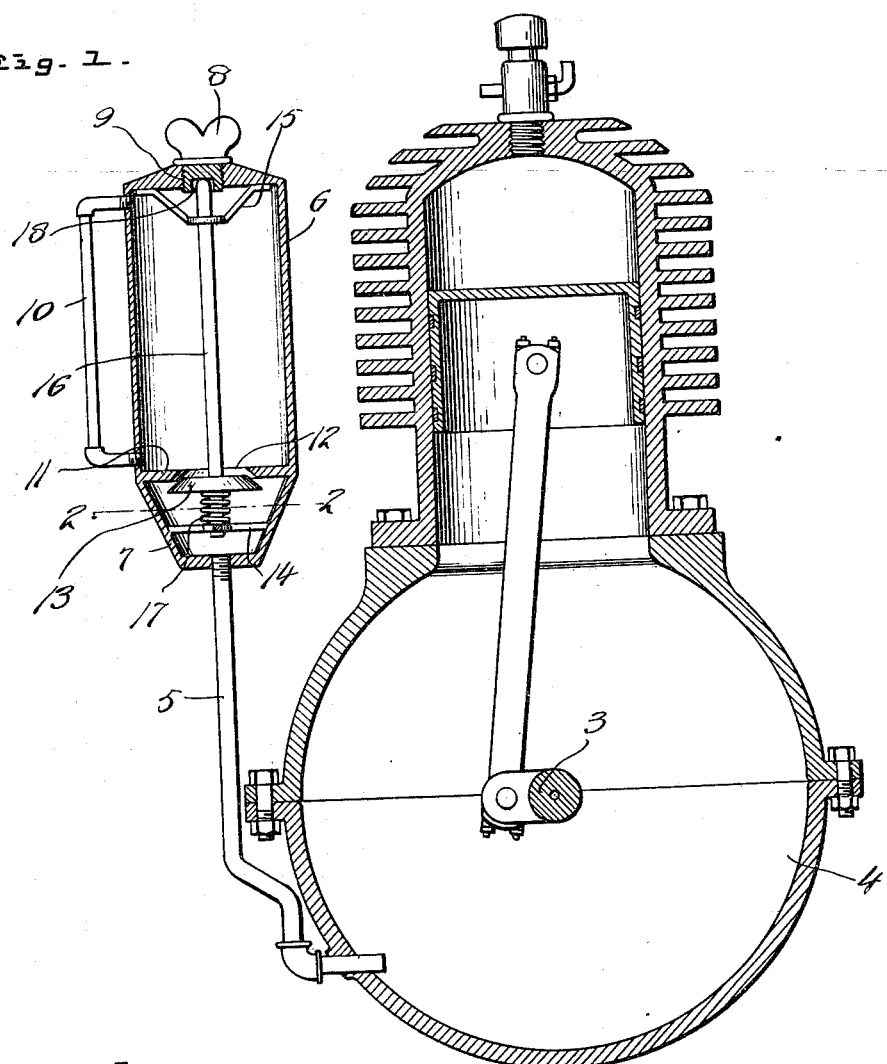
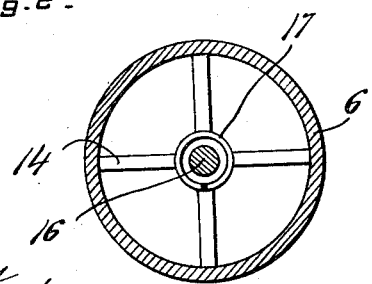

EDWARD HOVE, OF MARYSVILLE, CALIFORNIA.

LUBRICATING MECHANISM.

1,256,020.      Specification of Letters Patent.      Patented Feb. 12, 1918.

Application filed May 20, 1916. Serial No. 98,896.

*To all whom it may concern:*

Be it known that I, EDWARD HOVE, a citizen of the United States, residing at Marysville, in the county of Yuba and State of California, have invented certain new and useful Improvements in Lubricating Mechanism, of which the following is a specification.

This invention relates to lubricating mechanism for internal combustion engines and particularly to the type which supplies the lubricant to the crank case of the engine for distribution and use in accordance with the combined splashing and vacuum or suction principle.

I aim to provide a novel, improved, simplified and more efficient form of lubricator for the uses set forth and one possessing the advantages and attaining the objects hereinafter described and set forth in connection with accompanying drawings wherein one preferred embodiment is illustrated.

In said drawings:—

Figure 1 is a vertical sectional view through my improved lubricating mechanism, and an internal combustion engine with which it is associated; and Fig. 2 is a cross sectional view on the line 2—2 of Fig. 1.

Referring specifically to the drawings, a conventional type of internal combustion engine is illustrated in Fig. 1, of which the crank mechanism is shown at 3 and mounted within a crank case 4 to which a suitable lubricant supply pipe 5 leads.

The supply pipe 5 in turn leads from a lubricant reservoir 6 of any preferred construction, which preferably has a portion of its side wall adjacent the lower end tapered inwardly as at 7. A manually operable screw plug 8 serves as a removable closure for the reservoir 6 and is screw threaded thereto as at 9. A gage preferably in the form of the usual glass or transparent tube is provided at 10 so that the contents of the reservoir may be gaged and readily ascertained.

Disposed interiorly of the reservoir 6 and integral with its side wall is a plate 11 having a central opening at 12 serving as a seat for a flat frusto-conical valve 13. Spaced from the plate 11 and formed integral with the outer wall of the reservoir 6 is a spider or bearing 14. A bearing 15 is underhung from the top wall of the reservoir 6. Slidably mounted in the bearings 14 and 15, is a vertically movable rod 16 which serves as a stem for and carries the valve 13. Surrounding the stem 16 intermediate the valve 13 and spider 14 is a compression spring 17 which bears against the valve and the spider and tends to normally urge the valve into engagement with the seat 12 and cut off the supply of lubricant from the reservoir through the pipe 5 to the case 4. It will be noted, however, that the closure member 8 is provided with a cavity or recess at 18 into which the stem 16 extends.

The lubricant is supplied by gravity from the reservoir 6 through the pipe 5 into the crank case 4. The valve 13, however, is normally in engagement with its seat so as to cut off the supply of lubricant to the crank case but when the cap or plug 8 is screwed into the reservoir to a sufficient extent, it depresses the valve stem 16 and accordingly the valve 13 as shown in Fig. 1 so as to present an escape passageway for the lubricant. After the desired quantity of lubricant has entered the crank case 4, the top 8 may be unscrewed or entirely removed so that the spring 17 will force the valve 13 into engagement with its seat 12 and prevent further supply of lubricant to the crank case. It will be realized that the lubricant contained in the crank case will be splashed through operation of the crank and associated parts therein and in addition will be drawn into the cylinders on the suction strokes of the piston.

While I have shown one specific embodiment of the invention, yet I do not limit myself thereto since changes may be made without departing from the spirit and scope of the invention.

I claim:

1. A lubricating device of the class described having a reservoir, a valve to control the supply of lubricant therefrom, a closure member for said reservoir, and said member being operable independently of and against said valve to position the valve.

2. A lubricating device of the class described having a reservoir provided with an outlet valve, a rod for said valve extending from opposite faces thereof, bearing means for the rod, a spring on one side of the valve urging it to its seat, and means on the other side of the valve movable independently of and relatively to the valve to position the valve counter to the action of the spring.

3. A lubricating device of the class described having a reservoir provided with an outlet valve and a seat therefor, a spring abutting a part of the reservoir and normally urging the valve to its seat, and means additional to the spring carried by the reservoir movable independently of and relatively to the valve to position the valve counter to the action of the spring.

4. A lubricating device of the class described having a reservoir, said reservoir having a wall provided with an opening forming a valve seat, a valve to engage said seat, a rod intermediate the ends of which said valve is disposed, a spring surrounding said stem to urge the valve toward its seat, said spring abutting the valve, abutment means for the spring carried by the reservoir, and means carried by the reservoir movable against the stem to position the valve against the tension of said spring.

5. A lubricating device having a reservoir provided with a tapered side wall adjacent its base, a supply pipe leading from the base wall of the reservoir, said reservoir adjacent the junction of the tapering wall with the remainder of the side wall, having a wall provided with an opening forming a valve seat, a spider bearing extending from the tapered wall, a bearing adjacent the top of the reservoir, a stem slidably mounted in said bearing, a valve disposed intermediate the ends of said stem, a spring surrounding the stem intermediate the valve and spider bearing, a closure member adjacent the top of the reservoir, and said closure member being operable against the said stem to position the valve.

In testimony whereof I affix my signature in presence of two witnesses.

EDWARD HOVE.

Witnesses:
AUDREY FORD,
EDWARD B. STANWOOD.

Copies of this patent may be obtained for five cents each, by addressing the "Commissioner of Patents, Washington, D. C."